June 30, 1964

D. D. KEMPF ET AL 3,138,966

REMOTE CONTROLS

Filed June 15, 1962

INVENTORS
DENNIS D. KEMPF
GERALD D. ROHWEDER
BY CLIFFORD L. SHOEMAKER

*Fryer and Gjenvald*

ATTORNEYS

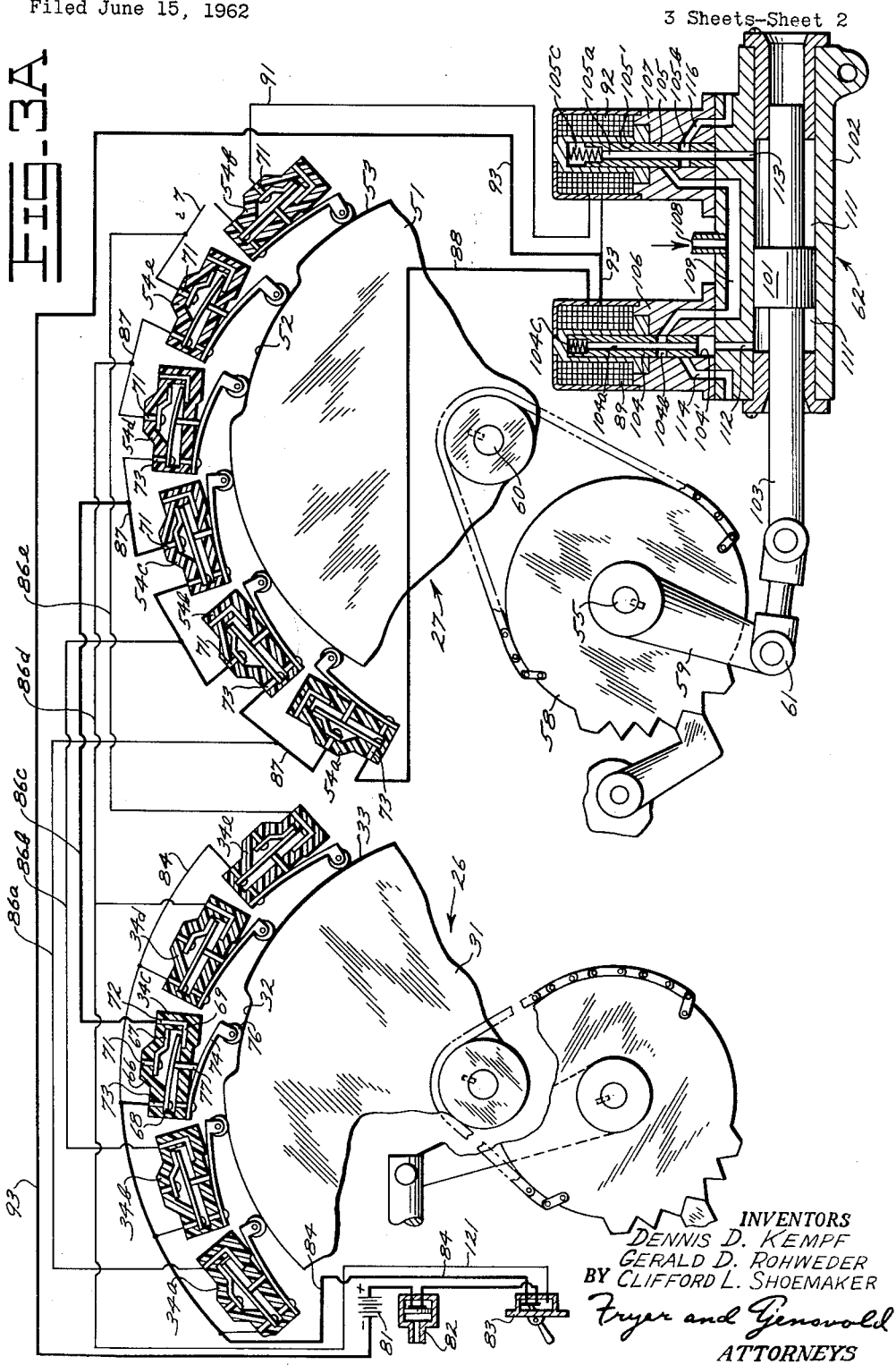

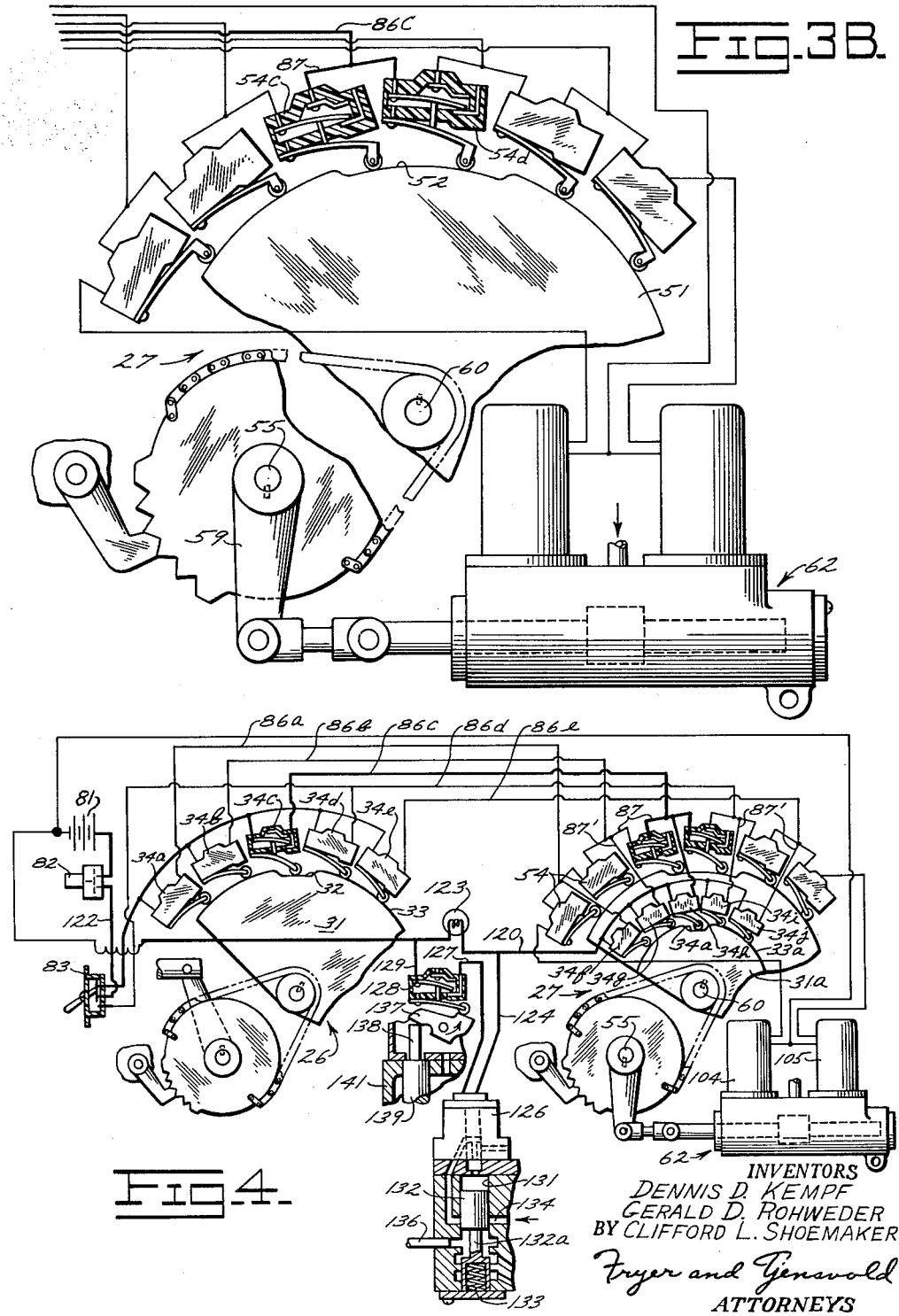

United States Patent Office 3,138,966
Patented June 30, 1964

3,138,966
REMOTE CONTROLS
Dennis D. Kempf, Roanoke, and Gerald D. Rohweder and Clifford L. Shoemaker, Peoria, Ill., assignors to Caterpillar Tractor Co., Peoria, Ill., a corporation of California
Filed June 15, 1962, Ser. No. 202,903
11 Claims. (Cl. 74—365)

The present invention relates to remote control systems and more particularly to a remote control system for use with a vehicle transmission, wherein a cam operated set of master microswitches and a cam operated set of slave microswitches are employed as means for transmitting the condition of a master transmission to a separate slave transmission and thereby enable correlated action therebetween.

At present in the earth moving industry the trend is toward bigger and more powerful earth moving equipment in an effort to maintain satisfactory production and profit levels. As the equipment increases in size additional power normally is provided through more effective drive trains, hydraulic or electric booster drives or auxiliary remotely disposed engines. It is in this last mentioned auxiliary power means where the present invention finds great utility.

A piece of earth moving equipment which is becoming increasingly popular is the auxiliary powered scraper having an engine, transmission and other necessary components for providing driving power to the scraper wheels. Scrapers, like many pieces of earth moving equipment are generally not equipped with power means and thus to be used are joined to a vehicle, such as a two wheel tractor, for providing driving force. Thus, when a scraper or similar piece of equipment is furnished with its own source of power it is necessary that its transmission and that of the puller tractor be coordinated to achieve maximum working power.

Accordingly, it is an object of the present invention to provide a remote control system for providing coordinating positioning of a slave mechanism in accordance with a master mechanism.

It is another object of the present invention to provide a remote control system which enables a transmission of an auxiliary power plant to be automatically shifted when the transmission of a primary power plant is shifted.

It is yet a further object of the present invention to provide a remote control system for a pair of separate vehicle transmissions wherein the remote control system assures that each transmission is operating at the same gear ratio at the same time.

Another object of the present invention is to provide a remote control for coordinating the operation of a pair of remotely disposed transmissions wherein the slave transmission is locked into a load gear when the master transmission is locked in a load gear, and further, where the slave transmission is effectively neutralized when a malfunction occurs in the remote control system.

Further and more specific objects and advantages of the invention are made apparent in the following specification wherein a preferred form of the invention is described by reference to the accompanying drawings.

In the drawings:

FIGS. 3a and 3b are schematic illustrations of the remote control system and show the manner in which it operates to shift the scraper transmission in response to a shift of the transmission of the tractor; and FIG. 4 is a schematic illustration of the remote control system provided with fail-safe and locking means.

Figures 1, 2:
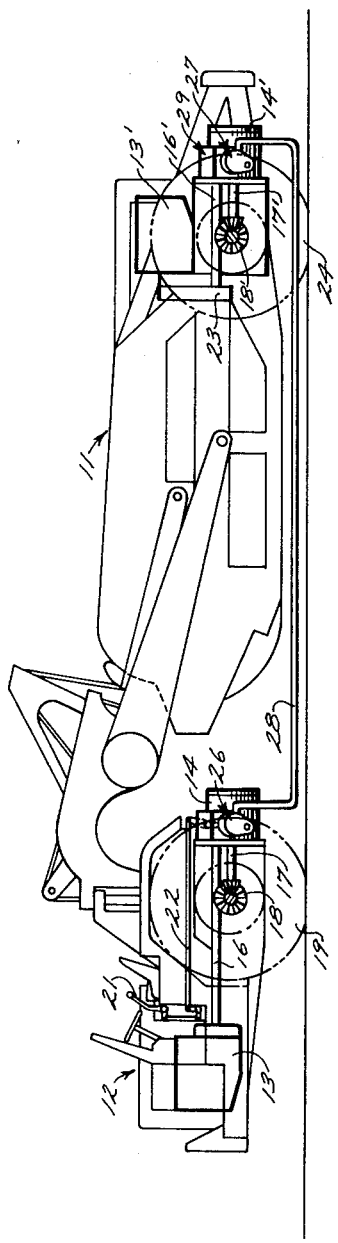
FIG. 1 is a semi-schematic illustration of a two wheel tractor having a scraper connected thereto wherein the tractor has a primary power plant including a transmission and the scraper has an auxiliary power plant including a transmission.
FIG. 2 is a schematic illustration of the remote control system of the present invention for coordinating the transmission of the tractor and the transmission of the scraper wherein the position of the components of the remote control system are shown when both transmissions are operating at the same gear ratio.

Referring now to FIG. 1, a scraper 11 is connected to a two wheel tractor 12 in a conventional manner. Tractor 12 has a power plant 13, most commonly of the internal combustion type, which delivers power to a transmission 14 through a drive shaft 16. An output shaft 17 from transmission 14 delivers drive power through gearing, generally indicated at 18, to the wheels 19. A driver operated lever 21 is connected by linkage 22 to transmission 14 and provides the means by which the transmission gearing ratio is shifted.

Scraper 11 is also provided with a power plant 13', generally of the internal combustion type, which delivers power to a transmission 14' through gears, generally indicated at 23, and a drive shaft 16'. An output shaft 17' from transmission 14' delivers auxiliary drive power to wheels 24 through gearing, generally indicated at 18'.

Since the auxiliary power plant 13' on scraper 11 is most effective in providing auxiliary power when the gear ratio of transmission 14' through which it delivers power to wheels 24 is coordinated with the gear ratio of transmission 14 through which power plant 13 operates to drive wheels 19, it is necessary to provide means for shifting transmission 14' in response to a gear shift in transmission 14. As it is obviously impractical, if not impossible, to provide linkage for controlling the ratio of transmission 14' from the driver's compartment of tractor 12, it is necessary to provide a remote control system for providing this function.

Accordingly, transmission 14 is provided with a master control 26 and transmission 14' is provided with a slave control 27. Master control 26 is connected to slave control 27 by means of a plurality of current carrying conductors in conduit 28. Thus, when transmission 14 is shifted by means of lever 21 master control 26 responds by providing a current in one of the conductors in conduit 28. This current is directed through slave control 27 to a solenoid operated hydraulic servo system generally indicated at 29 which operates to shift transmission 14' in a manner to be described in detail below.

Referring now to FIG. 2, master control 26 comprises a cam 31 having a depression 32 in its otherwise arcuate camming surface 33, five microswitches 30a–34e disposed in fixed positions about camming surface 33, and a chain drive mechanism 36 for positioning cam 31. Chain drive mechanism 36 connects cam 31 to link 41 by means of a chain 37 which engages a cam shaft 40 on cam 31, drive wheel 38 to which chain 37 is secured, transmission shaft 45 to which wheel 38 is keyed, and lever 39 which is secured at one end to shaft 45 and at its other end to link 41. Link 41 is part of linkage 22 (FIG. 1) which is manually positioned to shift transmission 14 through rotation of shaft 45. By virtue of wheel 38 being keyed to shaft 45, a transmission shift results in rotation of wheel 38 which drives cam 31 through chain 37.

The particular embodiment illustrated in FIG. 2 is designed for a transmission having three gears forward, a reverse gear and a neutral condition. Thus, wheel 38 has five discrete possible angular positions which it assumes depending upon which of the particular gear ratios transmission 14 is in. To insure that wheel 38, and thus cam 31, is in one of the five discrete positions, a spring biased pawl 42 engages a ratchet 43 on wheel 38 to compensate for any slack or backlash in the connection between link 41 and cam 31. In each of the five positions of cam 31 corresponding to a different gear ratio of transmission 14, depression 32 is radially aligned with one of the five microswitches. As will be described in more detail below, each of microswitches 34a–34e engages the camming surface 33 and is conditioned to create an open circuit except when radially aligned with depression 32. Thus, a change of gear ratios in transmission 14 is accompanied by a rotation of cam 31 which results in one of microswitches 34a–34e being conditioned from a "short circuit" state to an "open circuit" state and an accompanying reverse action taking place in one of the other microswitches.

Slave control 27 is very similar to master control 26 and comprises a cam 51 having a depression 52 in an otherwise arcuate camming surface 53, six microswitches 54a–54f disposed in fixed positions about camming surface 53, and a chain drive mechanism 56. Chain drive 56 connects cam 51 to a link 61 by means of a chain 57 which engages a cam shaft 60 on cam 51, drive wheel 58 to which chain 57 is secured, transmission shaft 55 to which wheel 58 is keyed, and a lever 59 secured at one end to shaft 55 and at its other end to link 61. Link 61 is connected to a position servo 62 (to be described in detail below). A pawl 63 and ratchet 64 on wheel 58 serve the same function as described in connection with pawl 42 and ratchet 43 of master control 26; namely, to insure that cam 51 is in one of five discrete positions.

Slave control 27 differs from master control 26 in that six, rather than five, microswitches are disposed about camming surface 53, and depression 52 is approximately twice the arcuate length of depression 32 to enable two microswitches to be aligned with the depression at each distinct position of cam 51. A further distinction is that the microswitches 54a–54f of slave control 27 are conditioned to a "short circuit" state when not radially aligned with depression 52 and to an "open circuit" state when radially aligned with the depression.

Referring now to FIG. 3a, it can be seen that the construction of the microswitches of master control 26 are identical with the microswitches of sleeve control 27 but are electrically connected in a manner which produces opposite circuit conditions under the same conditions. Each of the microswitches has a housing member 66 (see microswitch 34c) formed from an electrically non-conducting material and is mounted in a fixed position slightly above the respective camming surface with which it coacts. Housing members 66 have generally hollow interiors in which electrical contact members 67, 68 and 69 are mounted. Contact member 67 is secured to the upper interior portion of housing 66 and is provided with a terminal 71 which extends through the housing to enable electrical contact to be made with member 67 from the exterior of the microswitch. Contact member 69 is securely disposed on the lower interior portion of housing 66 and has a terminal 72 providing means for external electrical connection therewith. Contact member 68, which is prestressed, is secured within housing 66 in a cantilever manner wherein the unsupported end is disposed between contact members 67 and 69. A terminal 73 provides means for exterior electrical contact with member 68. A switch actuating arm 74 is secured at one end of the lower exterior portion of housing 66 and has secured to its free end a roller 76 which engages the camming surface 33 (in the case of master control 26, and 53 in the case of slave control 27). Arm 74 is prestressed so as to provide action similar to that of a leaf spring and thereby induce firm engagement of rollers 76 onto their respective camming surfaces. Electrical contact member 68 and arm 74 are secured to one another by means of a connection member 77 which extends through the lower portion of housing 66 and is fixed at one end to arm 74 and at its other end to member 68. By prestressing both of members 68 and 74 they cooperate to give a quick "snap" action, which prevents dangerous arcing and insures good contact.

When a microswitch is radially aligned with a depression in the camming surface, arm 74 is able to move downward thereby bringing member 68, to which it is connected, into contact with member 69, thus providing electrical continuity between terminal 73 and terminal 72. On the other hand, the contact which exists between members 67 and 68 (and thus the electrical continuity between terminals 71 and 73) when the microswitch is not aligned with a depression and roller 76 resides on camming surface 33, is broken. Thus, it can be seen that the three exterior access terminals 71, 72 and 73 at all times provide two terminals between which there exists an "open circuit." Thus, depending on which pair of terminals are used (terminal 73 always being one of the terminals) the microswitches are either normally open (normal condition being when not aligned with a depression) or normally closed. In the master control 26, terminals 73 and 72 are employed such that the microswitches are normally open (providing an "open circuit") while the microswitches of slave control 27 employ terminals 73 and 71, and are thus normally closed (providing a "closed circuit" therebetween).

While the microswitches of the present invention have been described in detail above, it will be apparent to those familiar with the art that there is a wide variety of available microswitches, many of which could be employed in place of those described. The electrical power source used in the present invention is D.C. of a sufficiently high magnitude, however, to require a "snap" type switch to reduce the dangers of arcing and insure good contact.

The electrical circuit for energizing and connecting the microswitches of master control 26 to slave control 27 includes a D.C. source of electrical potential indicated at 81, which is in series connection with a pressure switch 82 and a manually operated neutralizing switch 83, both of which will be described in fuller detail below. During normal operating conditions switch 82 is closed ("closed circuited") and switch 83 is positioned to connect the source 81 to an electrical conductor 84 connected to switch 83. Each of microswitches 34a–34e has its terminal 73 electrically connected to conductor 84 such that each of contacts 68 is at the same electrical potential as the positive terminal of source 81 and conductor 84. Except for the microswitch aligned with depression 32 the contacts 68 are in electrical continuity with contacts 67 and separated from contacts 69.

Inasmuch as terminals 71 of contacts 67 are not utilized, the microswitches not aligned with depression 32 are "open circuited" and thus unable to pass current. Microswitch 34c, however, as shown in FIG. 3a, is aligned with depression 76 establishing contact between members 68 and 69 and thus enabling the potential existing on terminal 73 to also exist on terminal 72 of microswitch 34c (assuming no resistance drop through the microswitch). Since each of microswitches 34a–34e have their terminals 72 electrically connected to an electrical conductor 86a–86e, respectively, the electrical potential on terminal 72 of microswitch 34c will also exist on conductor 86c which connects, in a particular manner to be described below, to slave control 27 thereby supplying an information signal thereto.

Thus, in general, it can be seen that the microswitches of master control 26 will be effective in placing an electrical potential on one of wires 86a–86e depending upon which of the particular microswitches is aligned with cam depression 32, and further since each gear condition of transmission 14 of tractor 12 corresponds to cam depression 32 being aligned with a different one of microswitches 34a–34e, the particular one of conductors 86a–86e which is provided with an electrical potential will always correspond to the existence of a particular gear condition in the master transmission.

Microswitches 54a–54f of slave control 27 are in electrical series connection with one another by virtue of gang leads 87 which connect terminals 71 and 73 of adjacent microswitches. Terminal 73 of microswitch 54a, however, is electrically connected by means of conductor 88 to a coil 89 of servo 62 while terminal 71 of microswitch 54f is connected by means of conductor 91 to a second coil 92 of servo 62.

Each of gang wires 87 is connected to one of conductors 86a–86e and more particularly conductor 86a is connected to the gang wire between microswitches 54a and 54b, conductor 86b is connected to the gang wire between microswitches 54b and 54c, conductor 86c is connected to the gang wire between microswitches 54c and 54d, conductor 86d is connected to the gang wire between microswitches 54d and 54e, and conductor 86e is connected to the gang wire between microswitches 54e and 54f. Thus, when an electrical potential is passed through one of microswitches 34a–34e of master control 26, such as switch 34c as shown in FIG. 3a, the potential is transmitted to and placed upon terminal 73 of one microswitch of slave control 27 and terminal 71 of an adjacent microswitch of slave control 27. As shown in FIG. 3a, terminal 73 of microswitch 54d and terminal 71 of microswitch 54c have an electrical potential imposed thereon by virtue of the fact that they are both connected to gang line 87 which connects with conductor 86c. Since microswitches 54a–54f are normally closed (establishing electrical continuity between terminals 71 and 73 of the same microswitch) and further since switches 54c, 54b and 54a are all in their normal condition, the electrical potential applied to terminal 71 of switch 54c will be applied to each of terminals 71 and 73 of microswitches 54b and 54a and thus further transmitted through conductor 88 to coil 89. On the other hand, switch 54d being aligned with depression 52 is not in its normal state and thus has an "open circuit" between its terminals 73 and 71, thus preventing the voltage potential impressed on terminal 73 from being transmitted to switches 54e or 54f. Thus, it is seen that when a voltage potential is placed on slave control 27, two possible paths are available to the potential, one leading to coil 89 and one leading to coil 92 but only one, if either at all, path will be electrically continuous so as to enable a potential to be impressed on a coil. A ground line 93 extends from the negative terminal of source 81 to each of coils 89 and 92 and thereby enables a complete circuit to be formed from the positive terminal source 81 through one of microswitches 34a–34e to a corresponding conductor 86a–86e leading to microswitches 54a–54f through gang wires 87 and then to either coil 89 or 92 and returning to source 81 through ground wire 93.

When a complete circuit is formed which includes coil 89, as shown in FIG. 3a, the flow of current therethrough activates servo 62 (in a manner to be described below) to rotate cam 51 of slave control 27 in a counter-clockwise direction. As long as current flows through coil 89, cam 51 will continue to rotate. When the circuit leading to coil 89 is broken the cam will come to rest. The condition under which the cam will come to rest is illustrated in FIG. 3b.

In FIG. 3b, slave 27 is illustrated with the cam 51 rotated to a position where both microswitches 54c and 54d are aligned with depression 52. As explained above, the alignment of switches 54c and 54d with depression 52 causes them to be conditioned to an "open circuit" state such that current is unable to pass through the switches. Since the only source of current is received by slave control 27 at switches 54c and 54d the over-all electrical circuit is rendered "open," thus preventing current from circulating therethrough. This being true neither coil 89 nor 92 will be energized and thus servo 62 will be deactivated. Thus it can be seen from FIGS. 3a and 3b that the alignment of microswitch 34c with depression 32 corresponds to the position of cam 51 in which microswitches 54c and 54d are aligned with depression 52. FIG. 3a illustrates a situation which occurs when a gear shift has been made in the master transmission but before the slave control has acted to shift the scraper transmission. By the position of depression 52 slave control 27 determines which direction cam 51 must be rotated in order to bring it into a position which corresponds to the position of cam 31 and in so doing shift the scraper transmission into a gear which corresponds to the gear selected for the tractor transmission. As lever 59 rotates from the position shown in FIG. 3a to that shown in FIG. 3b, shaft 60 also rotates thereby effecting a shift of the scraper transmission. It can be seen by reference to FIG. 3a that correlating positions exist between master control 26 and slave control 27 when switch 34a is aligned with depression 32 and switches 54a and 54b are aligned with depression 52; when switch 34b is aligned with depression 32 and switches 54b and 54c are aligned with depression 52; etc. Thus, whenever transmission 14 is shifted, cam 31 will rotate to a new position causing a voltage to occur on a different one of conductors 86a–86e which presents a signal to slave control 27. The signal received by slave control 27 is directed to either of coils 89 or 92 depending in which direction it is necessary to rotate cam 51. When the correlating position of cam 51 is reached the system automatically comes to rest.

As best illustrated in FIG. 3a, servo 62 comprises a piston 101 slidably disposed in a piston cylinder 102, a piston rod 103 connecting piston 101 to link 61, a pair of coil operated ported valve plungers 104 and 105 slidably disposed within valve bores 104' and 105', respectively, in valve bodies 106 and 107, respectively, and an inlet 108 for connection to a source of high pressure hydraulic fluid (not shown). A fluid passage 109 provides communication between hydraulic inlet 108 and valve bores 104' and 105'. Communication is also established between valve bores 104' and 105' and piston chamber 111 by means of passages 112 and 113, respectively, while passages 114 and 116 which communicate with valve bores 104' and 105', respectively, provide necessary fluid dump means. Plunger 104 has an axial bore 104a which communicates with passage 112 leading to chamber 111 and a transverse bore 104b which communicates with either passage 109 or passage 114 depending upon the position of plunger 104. Likewise, plunger 105 has an axial bore 105a communicating with passage 113 leading to chamber 111 and a transverse bore 105b communicating with either passage 109 or passage 116 depending upon the position of plunger 105. Each of plungers 104 and 105 has a spring 104c and 105c, respectively, which urges the plunger in a downward direction such that the position of the plungers when no current flows through the coil associated therewith is that shown assumed by plunger 105 in FIG. 3a. In this normal or unactivated condition, the source of high pressure fluid in passage 109 is prevented from entering chamber 111 through passage 113 while dump passage 116 communicates through transverse bore 105b, axial bore 105a, and passage 113 to chamber 111.

When current does flow through a coil, however, as is the case of coil 89 in FIG. 3a, the plunger is drawn to an upward position against the force of its biasing spring through the solenoid action between the coil and the plunger. In this "activated" position, plunger 104 communicates with passage 109 which carries high pressure fluid. The high pressure fluid is thus able to enter chamber 111 through transverse bore 104b axial bore 104a and passageway 112. High pressure fluid entering chamber 111 through passage 112 urges piston 101 in a rightward direction (as shown in FIG. 3a) causing a counter-clockwise rotation of wheel 58 which in turn imparts a similarly directed rotation to cam 51. When cam 51 reaches the position shown in FIG. 3b, the current to coil 89 is interrupted allowing spring 104c to return plunger 104 to its downward position wherein communication between high pressure passage 109 and chamber 111 is discontinued bringing the servo to rest. It is seen that as piston 101 moves to the right the fluid in that portion of the chamber to the right of piston 101 is able to discharge through passage 116 by virtue of the position of plunger 105.

When a shift of transmission 14 requires a clockwise rotation of cam 51, coil 92 has current flowing through it and thereby positions plunger 105 such that communication exists between high pressure line 109 and chamber 111 enabling the hydraulic fluid to move piston 101 leftwardly.

It is highly desirable that a remote control system employed to coordinate transmissions of the type disclosed in United States patent application of Leonard F. Dickerson, et al., Serial No. 49,587, for "Transmission System and Hydraulic Controls Therefor," filed August 15, 1960 and assigned to Caterpillar Tractor Co., now Patent No. 3,096,667 which issued July 9, 1963, provide means for locking the slave transmission in low gear when the master transmission is so conditioned, and preventing the slave transmission from operating at excessive speeds when a malfunction prevents the slave transmission from shifting properly. The transmission of the above identified patent application employs a torque converter to provide a low speed, high torque operating range. FIG. 4 illustrates a remote control system similar to that already described, but having in addition thereto means for locking the slave transmission in torque converter drive, and fail-safe means to prevent over-speeding of the slave transmission.

Connected to shaft 60 of the slave control is a second cam 31a having five microswitches 34f–34j disposed about its arcuate camming surface 33a. Camming surface 33a has a depression 32a which is aligned with one of switches 34f–34j when cam 31a is in one of its discrete positions. In this manner, the slave control is furnished with a cam and set of associated switches which are identical with the cam and switches of the master control. This second switch system on the slave control will be positioned such that the switch aligned with the cam depression 32a will correspond to the like switch of the master control which is aligned with the depression 32 when the slave control properly follows the master control. Each of switches 34f–34j, like switches 34a–34e, is normally open and caused to close only when aligned with the cam depression. Switches 34f–34j each has one terminal connected to a conductor 121 which is connected to conductor 122 between switch 82 and switch 83. A light bulb 123 is inserted in conductor 120 to provide a means for informing the operator of the tractor that current is passing through conductor 120.

The other terminal of switches 34f–34j is connected to a gang wire 87 between switches 54a–54f such that switch 34f receives current when conductor 36a from switch 34a carries current, switch 34g receives current when conductor 86b from switch 34b carries current, etc. Thus, when the slave control is in the position corresponding to the position of the master control, the switch aligned with depression 32a will receive current from the conductor connected to the switch aligned with depression 32. Since the switch aligned with the depression 32a forms a closed circuit, current will be transmitted to conductor 120, through light 123, and back to the negative terminal of source 81. Thus, as long as bulb 123 is lit, the operator of the vehicle can be assured that the slave control is in proper correspondence with the master control.

A conductor 124 connected to conductor 120 on the slave side of light 123 leads to one end of the coil of a solenoid operated hydraulic valve 126, while the other end of the coil is connected by a conductor 127 to one terminal of a normally closed microswitch 128. The other terminal of microswitch 128 is connected by conductor 129 to the master side of light 123. Thus, during normal operation, valve 126 will have current delivered thereto and thus have its coil energized.

Valve 126 includes a valve bore 131 having a valve spool 132 slidably housed therein. When the coil of valve 126 is energized it drives spool 132 downward, depressing spring 133 at the bottom of spool 132. In this position (as shown in FIG. 4) communication between an inlet port 134 and an outlet port 136 is blocked by spool 132. When the coil of the valve is not energized, however, spring 133 forces spool 132 upward to a position where the input and output ducts communicate through bore 132a in the valve spool. If a source of high pressure fluid is connected to the inlet port 134 and a hydraulically actuated mechanism connected to the outlet port 136, the operation of the mechanism is restricted to situations where current does not flow to the valve 126.

A lever 137 engages the actuating arm of microswitch 128 and determines its condition (open or closed circuit between its terminals). Lever 137 is actuated by push rod 138 which may be connected to a valve spool 139 of a valve 141. In its normal position valve spool 139 positions rod 138 so as to maintain lever 137 in a position which allows the arm of switch 128 to drop and thus keep the switch closed. If lever 137 is rotated counterclockwise, switch 128 is open the flow of current to valve 126 is disrupted. Thus, a mechanism receiving hydraulic actuating fluid from valve 126 can be operated by causing switch 128 to open.

If the mechanism which receives fluid from valve 126 is a hydraulic control system associated with the slave transmission, and is responsive to fluid pressure by shifting and holding the transmission in torque converter drive; and valve 141 is associated with the master transmission and moves so as to rotate lever 137 counterclockwise when the transmission is locked into torque converter drive (for heavy load operation), the control system of the present invention is provided with means for performing the desired functions stated above.

When the master transmission is locked into load range (torque converter drive), switch 128 will be opened, valve 126 will become de-energized, high pressure fluid will pass through valve 126, and the rear transmission will thereby be locked in converter drive. Correspondence between the transmission is thus insured.

When the master transmission is not locked in a load range and there is a malfunction in the remote control system which causes the slave control to assume a non-corresponding position with respect to the master transmission, the current from switches 34f–34j will not be transmitted to conductor 120. This will cause the coil of valve 126 to be de-energized and again the slave transmission will be shifted and held in torque converter drive. That a malfunction has occurred will be evident by the fact that light 123 is not lit. With the slave transmission thus shifted, the possibility of excessive speed in the transmission is eliminated and the lack of correspondence between gear ratios between the master and slave transmissions results only in inefficient operation of the rear power plant; not in damage due to over-speeding. When the operator notices (by the unlit light) that a malfunction has occurred, he can have it corrected or continue to operate the machinery until a more convenient time for repair presents itself. Thus, this fail-safe means not only prevents costly damage to the transmission but also enables the necessary repairs to be made with a minimum of down time.

While servo 62 has been described in detail it will be at once evident to those in the art that it is not unique in its ability to perform the desired function of rotating cam 51 in response to an electrical signal. The particular servo system described is advantageous for the particular application with which the invention has been described due to the presence of a supply of hydraulic working fluid, as well as the need for sufficient power to perform a transmission shift. However, where application of the present invention does not include an environment of high pressure fluid or the necessity for substantial shifting forces, a servo system of an electrical or even pneumatic nature might be advantageously employed.

Similarly, it is to be noted that while cams 31, 31a and 51 have been illustrated as single structures with their associated microswitches equally spaced in an arc about their camming surface, space requirements may make it more advantageous to use a plurality of cams which are stacked and act upon a stacked set of microswitches. This, however, would have no effect on the general operation of the invention as described since the electrical circuitry would be connected in the same fashion and operate in exactly the same manner. It is also to be noted that switches 34f–34j and cam 31a have been shown to be smaller than the other microswitches and cams only for purposes of illustrative clarity.

Switch 83, as shown in FIGS. 2 and 3a, is a manually operated switch having two positions. In one position, as shown in the drawings, it is effective in connecting source 81 to conductor 84 to supply source potential to the microswitches associated with cam 31. In its alternate position, however, it is effective in directing the source potential directly to gang line 87 between microswitches 54d and 54e by way of conductor 121 which connects to conductor 86d. In the embodiment illustrated, the alignment of microswitches 54d and 54e with cam depression 52, as occurs when voltage appears on conductor 86d, corresponds to a position of shaft 60 which places the scraper transmission in a gear in which it is effectively neutralized. Thus, by manually operating switch 83 the operator of tractor 12 can neutralize transmission 14' of the scraper as is advantageous when moving the scraper from one position to another and while it is not doing any work. It may also be advantageous to neutralize the scraper transmission when the work being done is not sufficiently heavy to require the auxiliary power from the scraper engine.

Pressure switch 82 serves to safeguard the system (maintains predetermined operating sequence and prevents overriding of the parent control by the slave control) in the event the parent tractor engine should stop unexpectedly with the auxiliary engine operating. Switch 82 thus provides a desirable safety feature which is actuated upon discontinued operation of the tractor engine.

We claim:

1. In a remote control system the combination comprising;
   a plurality of normally closed electrical switches in series connection;
   a cam engaging said switches and maintaining all but a pair of series adjacent switches in their normal closed state, the series adjacent pair being conditioned to an open state, the particular pair of series adjacent switches conditioned to an open state dependent upon the position of said cam;
   a plurality of electrical conductors, each one connected to a series connection between a series pair of switches;
   means for placing an electrical signal on one of said conductors; and
   an electrically actuated drive means mechanically connected to said cam to position said cam in one direction or the other, said drive means electrically connected to the first and last switches in said switch series such that a signal from one induces said drive means to position said cam in one direction while a signal from the other induces said drive means to position said cam in the other direction.

2. The remote control system of claim 1 wherein said means for placing an electrical signal on one of said conductors comprises;
   a source of electrical energy selectively connectable to any one of said conductors wherein the connection to a particular conductor represents a particular event.

3. In a remote control system the combination comprising;
   a plurality of normally open electrical switches forming a master circuit wherein each of said switches is connected to a source of electrical energy;
   first means operable to cause one of said switches of said master circuit to close;
   a plurality of normally closed electrical switches forming a slave circuit in which said switches are in electrical series connection;
   second means operable to cause a pair of series adjacent switches to open;
   each of said master circuit switches electrically connected to a series connection between said slave circuit switches;
   the first and last switches in the slave circuit series electrically connected to an electrically actuated positioning means which is in driving connection with said second means.

4. The remote control system of claim 3 further comprising;
   a variable position master member;
   means connecting said first means to said master member so that a change in position of said master member results in said first means causing a different one of said master switches to close; and
   a variable position slave member connected to said positioning means and positioned thereby.

5. In a remote control system the combination comprising;
   a first member having a plurality of discrete positions;
   a second member having a plurality of discrete positions corresponding to the positions of said first member;
   a first electrical switching circuit associated with said first member and having a particular state for each position of said first member;
   means acting on said electrical circuit to automatically condition it in the state corresponding to the particular position of said first member;
   a second electrical switching circuit associated with said second member and having a particular state for each position of said second member;
   means acting on said second electrical circuit to automatically condition it in the state corresponding to the particular position of said second member;
   said first circuit electrically connected to a source of electrical energy;
   said first circuit in electrical communication with said second circuit; and
   an electrically actuated positioning means in electrical contact with said second circuit and mechanical connection with said second member;
   said second circuit conditioned to pass an electrical signal to said positioning means when said second member is in a position not corresponding to the position of the first member, whereby said positioning means is actuated and positions said second member to the corresponding position of said first member at which position the signal from said second circuit is discontinued.

6. In a remote control system for use with a master transmission having a plurality of possible gear ratios and a slave transmission also having a plurality of possible gear ratios the combination comprising;
   a master electrical switching circuit associated with the master transmission and having a plurality of possible states in which it can be conditioned, each state corresponding to a gear ratio of the master transmission;
   means automatically conditioning said circuit to the state corresponding to the gear ratio of the master transmission;

a slave electrical switching circuit associated with the slave transmission and having a plurality of possible states in which it can be conditioned, each state corresponding to a gear ratio of the slave transmission;

means automatically conditioning said slave circuit to the state corresponding to the gear ratio of the slave transmission;

an electrically actuated shifting means electrically connected to said slave circuit and mechanically connected to the slave transmission in a manner enabling a gear shift thereof to be performed when said shifting means is actuated;

a source of electrical energy connected to said master circuit;

electrical connection means connecting said master circuit to said slave circuit;

said master circuit communicating, through said electrical connection means, a signal corresponding to the state of said master circuit to said slave circuit, said slave circuit communicating an actuating signal to said shifting means when the gear ratio of said slave transmission does not correspond to the gear ratio of the master transmission, said actuating signal effective to cause said shifting means to shift the slave transmission until a corresponding gear ratio is achieved, said slave circuit becoming effectively disconnected from said shifting means when in a state corresponding to a gear ratio of the slave transmission which corresponds to the gear ratio of the master transmission.

7. The remote control system of claim 6 wherein corresponding gear ratios between the master transmission and the slave transmission are the same gear ratio.

8. In a remote control system for use with a master transmission having a plurality of gear ratios and a slave transmission having a plurality of gear ratios the combination comprising;

a plurality of switches forming a master circuit wherein said switches are normally open;

a master cam engaging said switches and maintaining all but one in their normal state while one is conditioned to a closed state, the particular switch conditioned to a closed state being dependent upon the position of said cam;

means connecting said cam to the master transmission such that the position of said cam is different for each gear ratio of the transmission and thus a different switch is closed for each gear ratio of the transmission;

a source of electrical energy connected to each of said switches;

a plurality of switches forming a slave circuit wherein said switches are normally closed and are in electrical series connection;

a slave cam engaging said slave switches and maintaining all but two series adjacent switches in their normal state while the two are conditioned to an open state, the particular pair of series adjacent switches conditioned closed being dependent upon the position of said slave cam;

means connecting said slave cam to the slave transmission such that the position of said cam is different for each gear ratio of the slave transmission and thus a different pair of switches is open for each gear ratio of the slave transmission;

a plurality of electrical conductors connecting said master circuit to said slave circuit whereby each master switch is connected to two slave switches at their series connection;

an electrically actuated shifting means connected to said slave transmission and effective in shifting the gear ratio of said transmission when actuated; and electrical conductors connecting the first and last switches in said series of slave switches to said shifting means such that a signal from one induces said shifting means to shift said transmission in one direction while a signal from the other induces the shifting means to shift the transmission in the other direction.

9. The remote control system of claim 8 further comprising;

a manually operated two position switch electrically disposed between said source of electrical energy, said master switches, and one series connection between two slave switches;

in one position said switch directly connects said energy source and said master switches while disconnecting said source from direct connection with the series connection, in the other position said source is directly connected to the series connection and disconnected from said master switches.

10. The remote control system of claim 8 further comprising:

a plurality of switches forming a second slave circuit wherein said switches are normally open and each connected to a common conductor leading to said source of electrical energy;

a second slave cam connected to said slave transmission, said cam engaging said switches of the second slave circuit and maintaining all but one in their normal state while the one is conditioned to a closed state;

said second slave circuit and cam corresponding in number and position to said master circuit and cam and each of said second slave circuit switches electrically connected to one of said conductors from said master circuit such that corresponding switches between the master circuit and the second slave circuit are electrically connected; and an electrically actuated hydraulic valve connected to receive current from the conductor common to each of said second slave switches, said valve closed when electrically actuated and open when not so activated;

the slave transmission responsive to said valve being open to shift into a particular gear ratio.

11. The control system of claim 10 further comprising:

a mechanically operated normally closed switch in electrical series with said valve, said switch opening in response to a particular shift of said master transmission to cause said valve to open and thereby shift the slave transmission.

References Cited in the file of this patent

UNITED STATES PATENTS

| | | |
|---|---|---|
| 2,406,944 | Choate et al. | Sept. 3, 1946 |
| 2,438,283 | Hegy | Mar. 23, 1948 |
| 3,058,364 | Alfieri | Oct. 16, 1962 |
| 3,093,008 | Wight | June 11, 1963 |